Patented Jan. 10, 1939

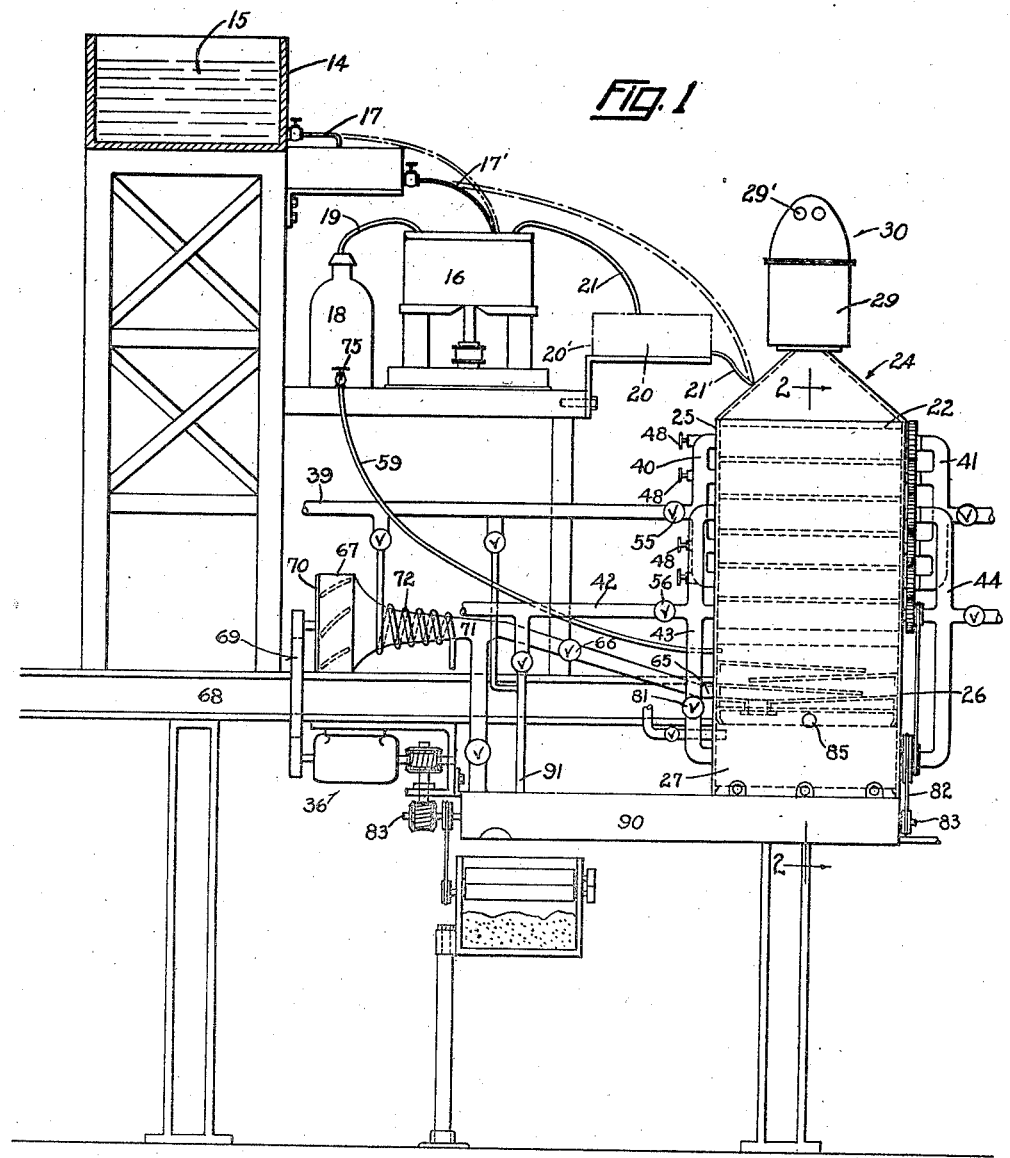

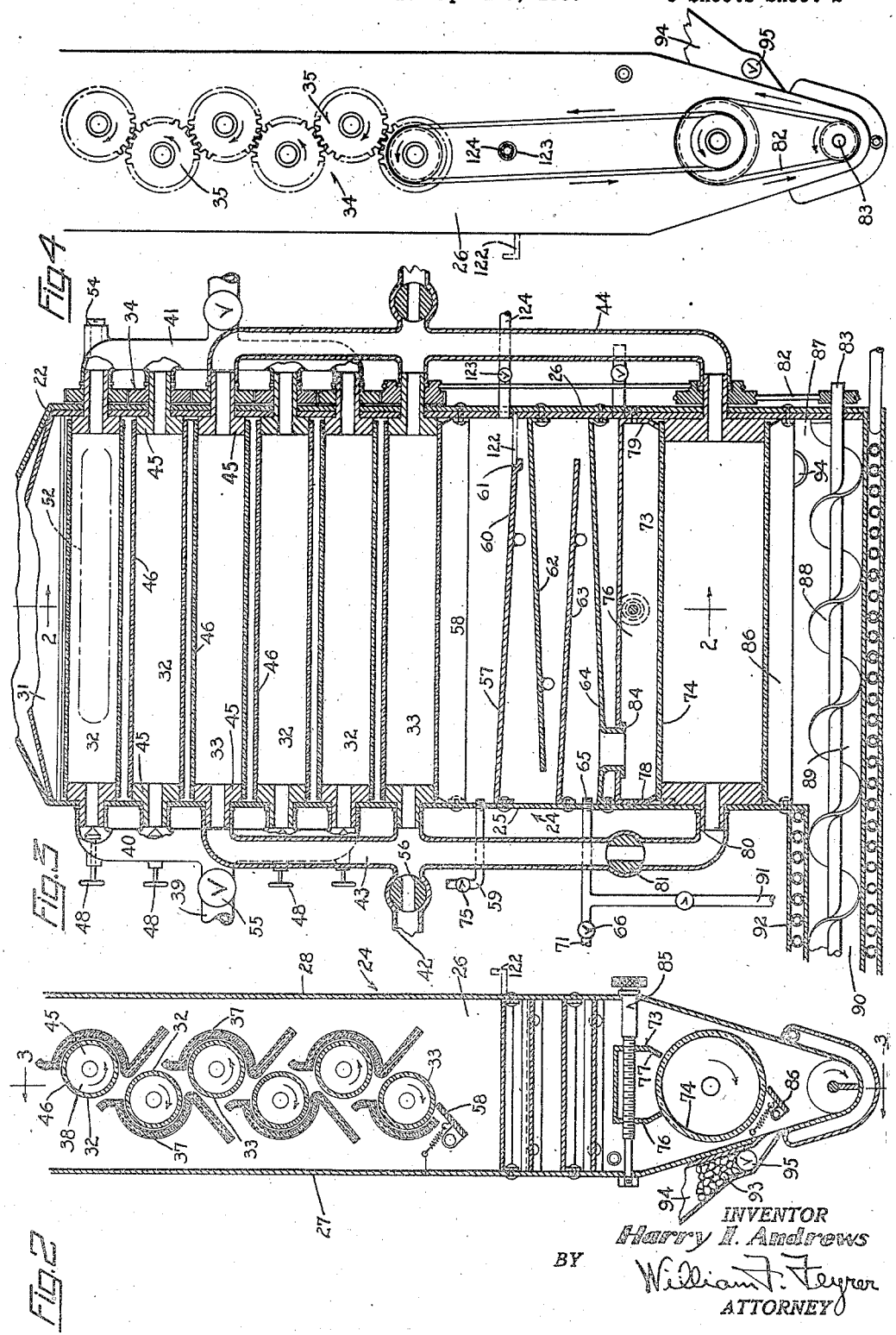

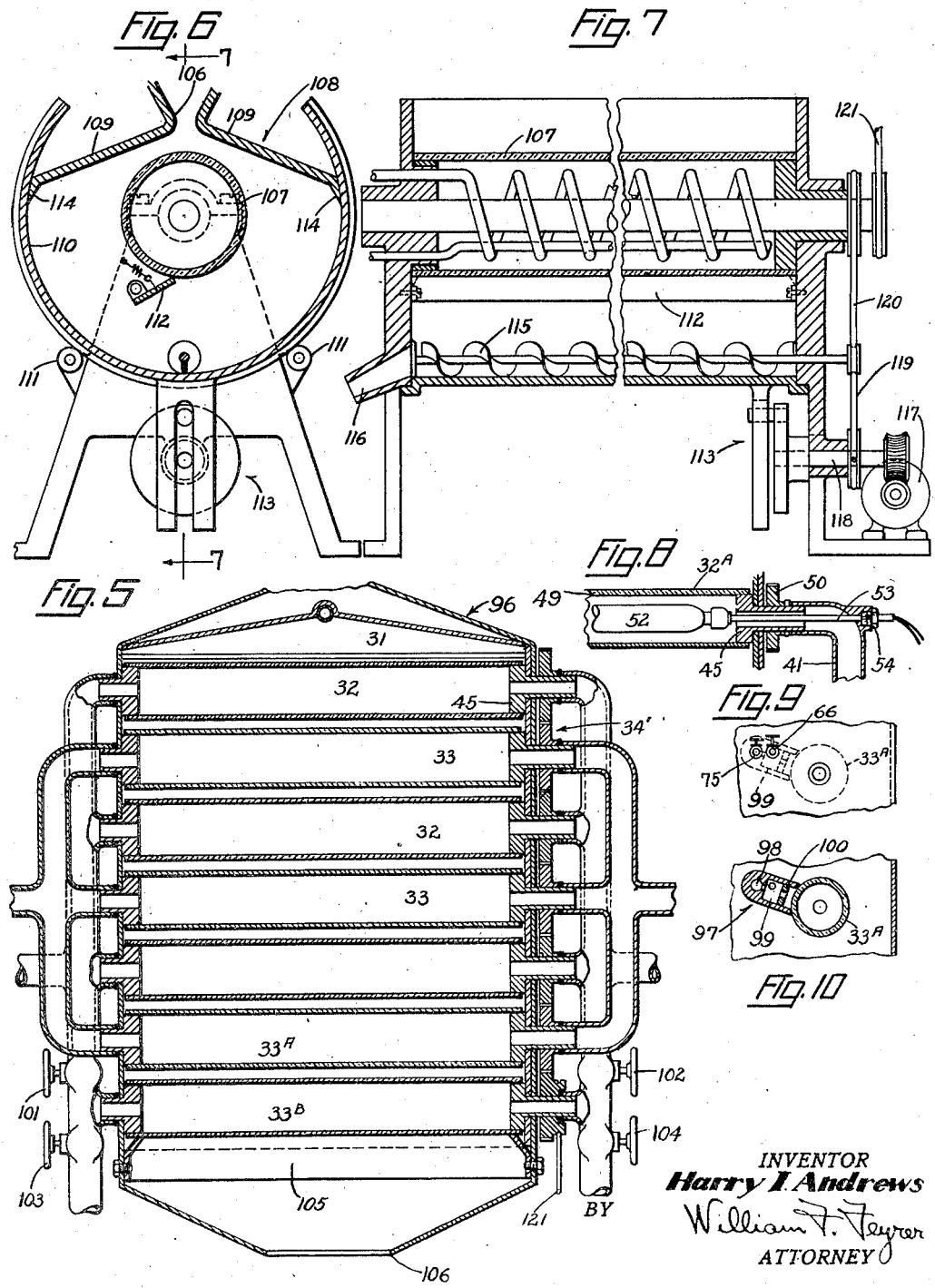

2,143,256

UNITED STATES PATENT OFFICE 2,143,256

PROCESS FOR DESICCATING MATERIALS

Harry I. Andrews, South Norwalk, Conn.

Application April 8, 1935, Serial No. 15,347

5 Claims. (Cl. 99—202)

The present invention relates to a novel process for desiccating milk and other products, and represents improvements on the disclosure of my United States Patent No. 1,012,578.

It is an object of this invention to provide an improved method of desiccating whole or skimmed milk, ice cream mixes and the like to reduce the same to the consistency of condensed milk or to substantially dry flakes or powder.

It is also an object of the invention to provide such a method whereby an improved milk product is produced which is capable, upon addition of water, to form milk that is practically undistinguishable from fresh whole milk.

It is a further object of this invention to provide an improved method whereby water may be removed from milk without impairing the nutritive value or taste of the milk.

Generally, the present invention relates to an improved process for desiccating not milk alone but various other products in a quick economical way, and without loss of important minerals and/or other elements.

In processes employed at the present time to produce dried milk and some other products, it is desired to free the product from bacteria. Heretofore it has been customary to provide a step of pasteurization in the dry milk process. However, this pasteurization process very often results in overheating the milk and in a definite loss or change of flavor in the final product.

It is an object of the present invention to provide a desiccating process, for producing dry milk particularly in which the bacteria may be destroyed, and yet have the product regain all of its original flavor and like properties when water is added later.

In meeting this object the present invention provides as a step in the dehydrating process, the step of subjecting the product to very high frequency oscillations, capable of destroying bacteria but having no adverse effects on the other constituents of the milk.

Thus, the present invention provides an improved condensed or dried milk, or other product, wherein bacteria are removed by high frequency oscillations.

At the present time there is a growing appreciation of improved health and food value of food products having vitamins naturally stored from sunlight. It is an object of the present invention to provide a process capable of irradiating products. For example, milk from cows within barns and fed from hay in the wintertime does not taste as good and is not as rich in sunshine vitamins as is milk produced out of doors with the fresh grass in the summertime.

The present invention provides a novel process wherein products may be irradiated in an efficient and economical manner, during the process of desiccating.

Thus, the present invention provides a new product including a condensed milk, dried milk, or the like, irradiated to improve its quality or to impart health giving qualities thereto.

Apparatus usually employed for desiccating milk and other products are most often built upon a spray principle and require bulky, awkward apparatus and take up much space.

It is an object of the present invention to provide a compact desiccating apparatus which will be capable of a large production but which will require but very little space.

Some of the features in connection with this object include the provision of a single housing adapted to dehydrate skimmed and/or whole milk (and to irradiate the product); to aerate, mix, and/or dry dehydrated skimmed milk; to congeal and/or break up the last mixed product; and/or to further dehydrate the congealed and/or broken-up product.

It is a further object to provide a highly efficient desiccating apparatus which is easy and economical to construct and which is easy to operate.

These and other objects, features, and advantages of this invention will more fully appear from the following description made in connection with the accompanying drawings illustrating suitable apparatus which may be used to carry out the method and in which similar parts are designated by similar reference characters.

In the drawings which illustrate the present preferred form of the invention:

Figure 1 is a plan view diagrammatically illustrating the complete apparatus of the present invention.

Fig. 2 is a sectional view through the main housing, taken on lines 2—2 of Figs. 1 and 3.

Fig. 3 is a sectional view taken on line 3—3 of Fig. 2.

Fig. 4 is a plan view of the right hand side of the main housing shown in Fig. 3.

Fig. 5 is a sectional view of a modified form of housing.

Fig. 6 is a section view of the congealing, breaking-up, and ejecting apparatus used with the housing shown in Fig. 5.

Fig. 7 is a sectional view of the apparatus shown in Fig. 6, taken on line 7—7 of Fig. 6.

Fig. 8 is a fragmentary detail of the irradiating mechanism.

Fig. 9 is a fragmentary showing of the mixing or aerating device.

Fig. 10 is a sectional view of the device shown in Fig. 9.

Referring to Figs. 1 through 4, there is shown a storage tank 14 in which the milk 15 may be kept under appropriate conditions of temperature until it is to be treated. This tank is connected with a cream separator 16 by means of pipes 17 and 17' (which may be provided with valves and metering devices in order to control and measure the flow of milk from the tank). The separated cream is discharged into a tank 18 through a pipe 19 while the skimmed milk is discharged from the separator into a suitable sterilizer 20 through a pipe 21. This sterilizer may comprise an ozonizer as illustrated in my aforesaid patent, or it may take the form of means for subjecting the milk to high frequency electro-oscillations such as is described in U. S. Patent 1,863,222.

By thus subjecting the milk to high frequency vibrations it is possible to destroy bacteria or germs and to do this without overheating and without destroying the enzymes or life of the milk.

The sterilizer may be located to sterilize only the skimmed milk as shown by dot and dash lines 20' in Fig. 1, or it may be located before the separator as shown by full lines in the same Fig. 1 in order to sterilize the whole milk.

The sterilizer discharges the skimmed milk into the primary evaporator 22. The evaporator consists of a substantially air tight main casing 24, including side walls 25 and 26, front and rear walls 27 and 28 surmounted by a smaller casing 29 in which an air or vacuum pump 30 is mounted. A pipe 21', which carries the skimmed milk from the sterilizer, discharges onto an inclined tray 31 which distributes the skimmed milk in a relatively thin film for application to the hot and cold rolls 32 and 33 respectively mounted in the main casing. The several rolls are mounted for rotary movement and a suitable driving mechanism 34 such as a chain and sprocket or intermeshing gears 35 as shown is provided in order to transmit rotary movement from a motor or other driving connection 36.

With the rolls arranged in more or less staggered relationship, the driving mechanism is so arranged that adjacent rolls rotate in opposite directions (see Figs. 1 through 4). If so desired, the several rolls 32 and 33 could be arranged in substantially the same vertical plane, in which event all the rolls could be rotated in the same direction or in the opposite directions as described above. Regardless of the direction of rotation of the rolls, insulating shields 37 may be arranged opposite the ascending sides of the respective rolls to reduce radiation losses.

Each roll of the evaporator has a hollow chamber 38 and is provided internally with means for heating or cooling the roll. The heated rolls may be heated electrically or by passing steam or any heated fluid from a feed pipe 39 to an inlet manifold 40 and outlet manifold 41 and intermediately influencing the inner surface of the rolls. The cold rolls 33 may be cooled by passing refrigerated brine or other fluid through a main pipe 42 to an inlet manifold 43 and outlet manifold 44 arranged within the roll.

Now it should be noted that the rolls 32 and 33 are each, as shown in Fig. 3, provided with hubs 45 having suitable bearings in the side walls and support glass tubes 46 so that the heat or cold passing therefrom to the products engaging the roller are not given a metallic taste.

Temperature of the individual hot rollers 32 may be regulated by individual valves 48 so that one may be hotter or cooler than the other (see Fig. 3) and the individual rollers may be directly interspersed as in my aforesaid patent. Preferably, the improved apparatus of the present invention, in order to speed up the evaporation or desiccation processes includes groups of three rolls each. The top roll of each group is heated to such a temperature that the outer periphery of the roll is maintained at a temperature of approximately 145°–150° F. The next roll below is heated so as to obtain a temperature of approximately 135°–140° F. at the outer periphery of the roll. Temperature of individual rolls may be controlled by the individual valves 48. The third roll of each group is cooled so that the temperature at the outer periphery of this roll is preferably 35°–40° F.

Any desired number of groups of three rolls each may be provided in order to obtain the desired dehydrating action.

If it is desired to produce an irradiated product, means may be provided as in the evaporator 22 to achieve this end. For example, a special roll 32A such as shown in Fig. 8 may be included in the stack. This roll consists of a cylinder 49 of material such as quartz glass that is capable of transmitting ultra violet rays. The cylinder is supported at its ends by the heads 45 provided with suitable journals for rotation in bearings within the casing walls. Gear or sprocket wheel 50 is provided on one journal for rotating the roll in the manner described. Inlet and outlet holes are provided in the journals in order that this roll may perform the same function as the other rollers in addition to irradiating the milk passing over its periphery. A generator of ultra violet rays such as a mercury arc lamp 52 is rigidly mounted within the roll 32A and is supported by a pipe 53 which extends through the opening in one of the journals and is connected to the manifold 41 by a coupling 54.

Other ways in which the milk may be irradiated suggest themselves, for example a mercury arc lamp and reflector may be arranged over the inclined supply tray 31 or adjacent one or more of the rolls.

If steam or heated fluid is used to heat the rolls, some economy may be effected by causing the heated fluid discharged from the hottest roll 32 of each group to pass through the adjacent cooler roll. The heating fluid discharged from this roll may thereafter be utilized to heat boiler feed water or forming hot water for general use in the plant.

Suitable valves 48, 55, and 56 are arranged to control the supply of heat and cold to the respective rolls. Thermometers or pyrometers, visual or recording, not shown are provided to guide the operator in the manipulation of the valves.

At the bottom of the evaporator section 22 a trough 57 is mounted to receive the concentrated milk as it is discharged from the lowermost roll 33. A doctor blade 58 may be provided to scrape the lower roller. A pipe 59 conducts the cream from tank 18 and discharges the same into the trough 57 and is controlled by a valve 75. As shown in Figs. 1 and 3 the end 60 of trough 57 is inclined downwardly to form a discharge end 61. Arranged below the discharge end 61 is a plurality of trays 62, 63, and 64, each tray being inclined in a direction opposite to that of the tray immediately above. The mixture of cream and concentrated skimmed milk cascades in a zig-zag course down over the several trays.

Adjacent the lowermost tray 64 an air inlet 65 is provided through which air may be admitted and controlled by a valve 66. A blower 67 on the frame 68 and actuated by a belt connection 69 to the main driving mechanism 36 is adapted to draw air through a screen 70 and to force it through a line 71. The valve 66 controls the extent of flow, and a coil 72 associated with the line 71 is adapted to heat the air passed therethrough.

Under the action of the air pump 30 provided in upper casing 29 air is drawn through the inlet 65 and upwardly over the trays 64, 63, and 62 and through the cascading mixture countercurrent to the flow thereof, aerating it and causing additional removal of moisture from the same.

The blower 67 or the pump 30 alone may force air through the line 71 upwardly over the trays and rollers.

The mixture is discharged from the lowermost tray 64 to a head box 73 which is mounted adjacent a large roll 74. The head box 73 consists of a pair of side members 76 and 77 that extend the length of the roll 74 and end members 78 and 79. One side member 76 alone or with sealing means is mounted to bear against the roll to prevent leakage of the mixture from the head box. The other side member 77 is adjustably mounted and is so arranged that a space of uniform width exists between the roll and said side member for the discharge of material from the head box. This roll is maintained at a temperature of approximately 35° F. by means of a connection 80 with a refrigerant manifold 43 and valve 81, and is rotated by the motor 36 as by a belt connection 82 to a shaft 83, all as shown in Figs. 1, 3, and 4. The mixture is discharged into the head box at one end of the same and flows lengthwise of the roll to such a point that the lateral discharge under the side of the head box is sufficient to remove the mixture from the head box as rapidly as the mixture is supplied. The side of the head box is maintained at a uniform distance from the roll in order to insure the formation of a film on the roll of uniform thickness. Means may be provided in order to adjust this side in order to vary the thickness of the film and/or the capacity of the roll.

A coupling 84 joins the tray 64 and head box 73 together yet permits transverse shifting of the latter, which shifting is effected by a screw 85, to move the wall 77 relative to the roller 74 and thereby vary the film.

The mixture is congealed to a thin brittle film on the roll 74. A doctor blade 86 is provided to scrape the film from the roll as thin flakes, and discharge the same into a hopper 87 located above a screw conveyor 88 which is preferably of a length considerably greater than that of the roll 74. The flakes pass from the hopper 87 down into the trough 89 where the screw 88 operates. The screw may be operated by the main drive 36 shown in Fig. 1. Rotation of the screw transports the flakes from beneath the hopper and into the housing 90. During the transportation of the flakes through housing 90, a current of air from a side duct 91 of the line 71 is forced over the flakes to evaporate the remaining removable water to obtain the desired product. During the earlier stages of the movement of the flakes by the screw, it may be desirable to maintain the flakes at a relatively low temperature. This may be accomplished by arranging coils 92 around the housing 90 and trough 89. A very simple and practical way of achieving this result is to add small lumps of solid carbon dioxide 93 to the flakes at the inlet end of the screw 83 from a hopper 94 and control 95. The solid carbon dioxide sublimes, refrigerating the newly formed flakes as desired. Furthermore, the gaseous carbon dioxide formed assists in the final dehydration of the chips. A current of dry air at normal room temperature, or heated by the coil 72, is introduced at the discharge end of the screw. This air passes countercurrent to the flakes in the housing 90 to effect a very complete dehydration, and passes through to the main casing 24 thence upwardly and out of the openings 29'.

Briefly, the process for desiccating milk would be as follows: Upon obtaining sufficient milk to commence operations, milk is discharged from the reservoir 15 to the cream separator 16. Cream is separated and removed to a suitable tank 18, the skimmed milk being passed through a suitable sterilizer 20.

Alternatively, the whole milk may be sterilized and then separated. (The whole milk, sterilized or not sterilized, may be passed to the evaporator without separation if preferred.) In any event, sterilized skimmed milk is passed into the primary evaporator 22 where the skimmed milk is first passed onto a roll.

In the present preferred form it is first passed over a pair of hot rollers 32, the surface temperature of the first being approximately 145°–150° F. It is not desirable to heat milk above 140° F. but the milk is in contact with this roll for such a short period of time that the milk does not reach the temperature of the roll surface. The milk then passes to another heated roll, the surface temperature of which is approximately 135°–140° F. After passing down this roll, the milk is chilled by the cold roll 33. This cycle of temperature treatments is repeated one or more times until the desired concentration of skimmed milk is obtained. During the said treatment in the primary evaporator, air is continuously drawn through and over the milk to assist evaporation.

As the concentrated skimmed milk passes into the trough 57 the cream is remixed with the skimmed milk. This mixture is allowed to cascade downwardly over the trays 62—64 while passing air through and over the mixture whereby the mixture is further evaporated, the cream and skimmed milk are thoroughly intermixed and aerated. This material is a commercially salable article and may be canned and sold. If it is desired to convert this concentrated material to a substantially dry flake or powder, the concentrated material is congealed to a thin hard film on the refrigerated roll, the film broken up to a flaky material which is further dehydrated by passing the same through a housing 90 where it is subjected to air which is progressively drier as the flakes approach the point of discharge.

In the last step the product may be dehydrated further by the addition of carbon dioxide which is dissipated as the product in the housing 90 may be subjected to heat or to cold through coils 92.

Figs. 6 through 10 disclose a modified form of the present invention. Figs. 5, 9, and 10 disclose a very simple and economical form of evaporator, comprising a main casing 96, shorter than the first form main casing 24, and having hot and cold rollers 32 and 33. As shown, the hot rollers are not in pairs, but can be if preferred as hereinbefore described. The driving mechanism 34' is substantially the same as with the first form 34.

The important difference with this modified form is that a mixing member 97 of a substantially U-shape is provided adjacent the lower cold roller 33A and is adapted to mix air and cream together and then to pass these to the roller 33A for mixture with the dehydrated skimmed milk. To this end a duct 98 in the member 97 receives cream from a valve 75 and air is passed from a valve 66 into a mixing chamber 99. Thereafter the mixed air and cream are projected through an opening 100 onto the roller 33A and may flow from the latter onto the lowermost roller 33B where it will be further subjected to heat for final dehydration of the product if the valves 101 and 102 are open, and the valves 103 and 104 are closed; or to cold if the first mentioned valves are closed and if the valves 103 and 104 associated with a supply of refrigerant are opened. A doctor blade 105 scrapes and breaks the product from the roller 33B. This final product drops from the spout 106 to any suitable container for final distribution. The final product may be an evaporated milk or a broken-up dry milk as it comes from the roller 33B, dependent upon the degrees of heat and cold applied to the rollers.

If it is desired to heat and dehydrate the mixed cream and dehydrated skimmed milk on the roller 33B, another step is preferably, though not necessarily, provided with this modified apparatus, which may be seen best in Figs. 6 and 7. This step includes passing the mixed product to a cold roller 107 in a supplemental housing 108 comprising a cover plate 109 connected with the spout 106 of the casing 96 and which engages with an oscillatable cradle 110 supported on rollers 111.

The roller 107 may have a refrigerant passed therethrough in the manner of roller 74 of Fig. 3. A doctor blade 112 scrapes and breaks the material from the roller. A pin and slot driving mechanism 113 serves to oscillate the cradle 110 relative to cutting edges 114 and to a screw 115, the latter pushing the final product from a spout 116 to any suitable container. A motor 117 drives a shaft 118 for the cradle 110, and through the belts 119 and 120 operates the screw 115 and roller 107 and through a belt 121 operates the driving mechanism 34'.

The trough and the trays 57, 62, 63, and 64 may be disposed at any desired angle. If the skimmed milk coming from the lowermost roll is thoroughly dried or if it is a stiff liquid, the trough and trays may be at a 45 degree or greater angle.

The housing 90 and trough 89 of the casing 24 with the screw 88 may be removed so that the product will drop from the doctor blade 86 for suitable distribution. As shown by dot-and-dash lines in Figs. 1–4, the upper trough 57 may be provided with a valve plate 122 slidable on the trough and in the side wall 26. When the slide is back and a valve 123 closed, the aperture between the ends 61 of the trough 57 and wall 26 allows the material to flow down into the tray 62 next below.

However, when the valve plate 122 is pushed in it closes the gap so that the material cannot reach the tray and when the valve 123 is opened an evaporated skimmed milk may be passed to suitable containers from the line 124. Similarly, by passing cream to the trough from the valve 75 and line 59 an evaporated whole milk may be passed out through the valve 123 and line 124.

Other variations and modifications may be made within the scope of the present invention, and portions of the invention may be used without others.

Having thus illustrated and described the invention, what is claimed as new is:

1. A process of desiccating material which comprises passing the material over a plurality of alternate hot and cold rolls, thereafter causing the treated material to cascade downwardly in the form of a thin sheet over a plurality of trays while causing a stream of air to flow in a direction countercurrent to the flow of material, whereby to dehydrate and aerate the material.

2. A process of desiccating material which comprises passing the material over a plurality of alternate sets of hot rolls and individual cold rolls, the first roll of each set being heated to a temperature slightly above the maximum to which the material may be heated without detriment, the next roll being heated to a temperature on the average of 10° F. cooler than said first roll and the third roll being cooled to about 40° F., thereafter causing the treated material to cascade downwardly in the form of a thin sheet over a plurality of trays while causing a stream of air to flow in a direction countercurrent to the flow of material, whereby to dehydrate and aerate the material.

3. A process of concentrating milk which comprises separating the cream from the milk, sterilizing the milk, passing the skimmed milk over a plurality of alternate hot and cold rolls to evaporate most of the water from the milk, mixing the separated cream with the concentrated milk and causing the mixture to cascade downwardly in the form of a thin sheet over a plurality of trays while causing a stream of air to flow countercurrent to the flow of material whereby to dehydrate and aerate said material.

4. A process of concentrating milk which comprises separating the cream from the milk, sterilizing the milk, passing the skimmed milk over a plurality of alternate sets of hot rolls and individual cold rolls, the first roll of each set being heated to a temperature sightly above the maximum to which the material may be heated without detriment, the next roll being heated to a temperature on the average of 10° F. cooler than said first roll and the third roll being cooled to about 40° F. to evaporate most of the water from the milk, mixing the separated cream with the concentrated milk and causing the mixture to cascade downwardly in the form of a thin sheet over a plurality of trays while causing a stream of air to flow countercurrent to the flow of material whereby to dehydrate and aerate said material.

5. A process of concentrating milk which comprises passing the milk over a plurality of alternate hot and cold rolls, thereafter causing the milk to cascade downwardly in the form of a thin sheet over a plurality of trays while causing a stream of air to flow in a direction countercurrent to the flow of milk whereby to further dehydrate and aerate said milk, applying this dehydrated and aerated milk to a cold surface to congeal the same to a thin brittle film, scraping the film from the cold surface, and passing the resultant flakes through a zone where the flakes are subjected to the dehydrating action of a current of air.

HARRY I. ANDREWS.